April 19, 1955

C. SMITH 2,706,599

CARD CONTROLLED APPARATUS

Filed July 29, 1950

2 Sheets-Sheet 1

Inventor:
Clyde Smith
By [signature]
Attorney

April 19, 1955

C. SMITH 2,706,599

CARD CONTROLLED APPARATUS

Filed July 29, 1950

2 Sheets-Sheet 2

INVENTOR
Clyde Smith
BY
[signature]
ATTORNEY

United States Patent Office 2,706,599

Patented Apr. 19, 1955

2,706,599

CARD CONTROLLED APPARATUS

Clyde Smith, Hopkinsville, Ky.

Application July 29, 1950, Serial No. 176,581

17 Claims. (Cl. 235—61.11)

This invention relates to improvements in card-control apparatus, and has as its principal object the provision of a special control card and means for sensing such a card in any position, with the further object of obviating any necessity for placing or feeding the card to the machine in a particular position.

The invention further embraces the provision of sensing means and circuits for use with card-controlled apparatus employing perforated cards and the like and rendering the card effective in any number of positions, so that in the case of a squared card, as one example, the operator need pay no attention as to whether the card is fed into the machine face-up or face-down, or on one edge or another, the sensing means being contrived to produce a proper translating and reading of the control data on the card without regard to its orientation during either the feeding or the sensing operations.

Additionally, the invention contemplates a form of control card and sensing means therefor which employ pilot indications on the cards and circuit means controlled thereby to set up circuit conditions for the remaining data indications on the card in such manner that, in whatever position a card or cards may be placed in the machine, the intended data will be read and evaluated properly with reference to the pilot indication.

A further detailed object of the invention is the provision of omnipositional control card means for use with article-feeding, sorting, classifying, counting and dispensing apparatus of the type controlled by a card, ticket, or sheet having perforations or similar sensing indicators or control factors arranged thereon in accordance with a predetermined omnipositional pattern and certain sensible pilot indicia or factors to change control circuits in accordance with the possible relative positions of the pilot indicia so that the card will be sensed to yield the same sequence or value of control intelligence no matter what the position of the card happens to be in the sensing unit.

Another important object is the provision of a multi-position control card of square configuration which is thereby adapted to easy and rapid stacking, sorting, and clerical handling.

Yet another object is the provision of a perforate or like control card having a certain pattern and scheme of distribution for the control perforations or analogous sensing marks, and so contrived as to render the card operative in any of a multitude of possible positions, edgewise and facewise, in a feeding and sensing mechanism.

Additional objects and aspects of novelty and utility pertain to details of the control cards, circuits, and operations of the exemplary embodiments described hereinafter in view of the accompanying drawings, in which:

Figs. 1–A and 1–B are pilot-perforation coordinate diagrams;

Figures 1, 1A, 1B, 2, 4:
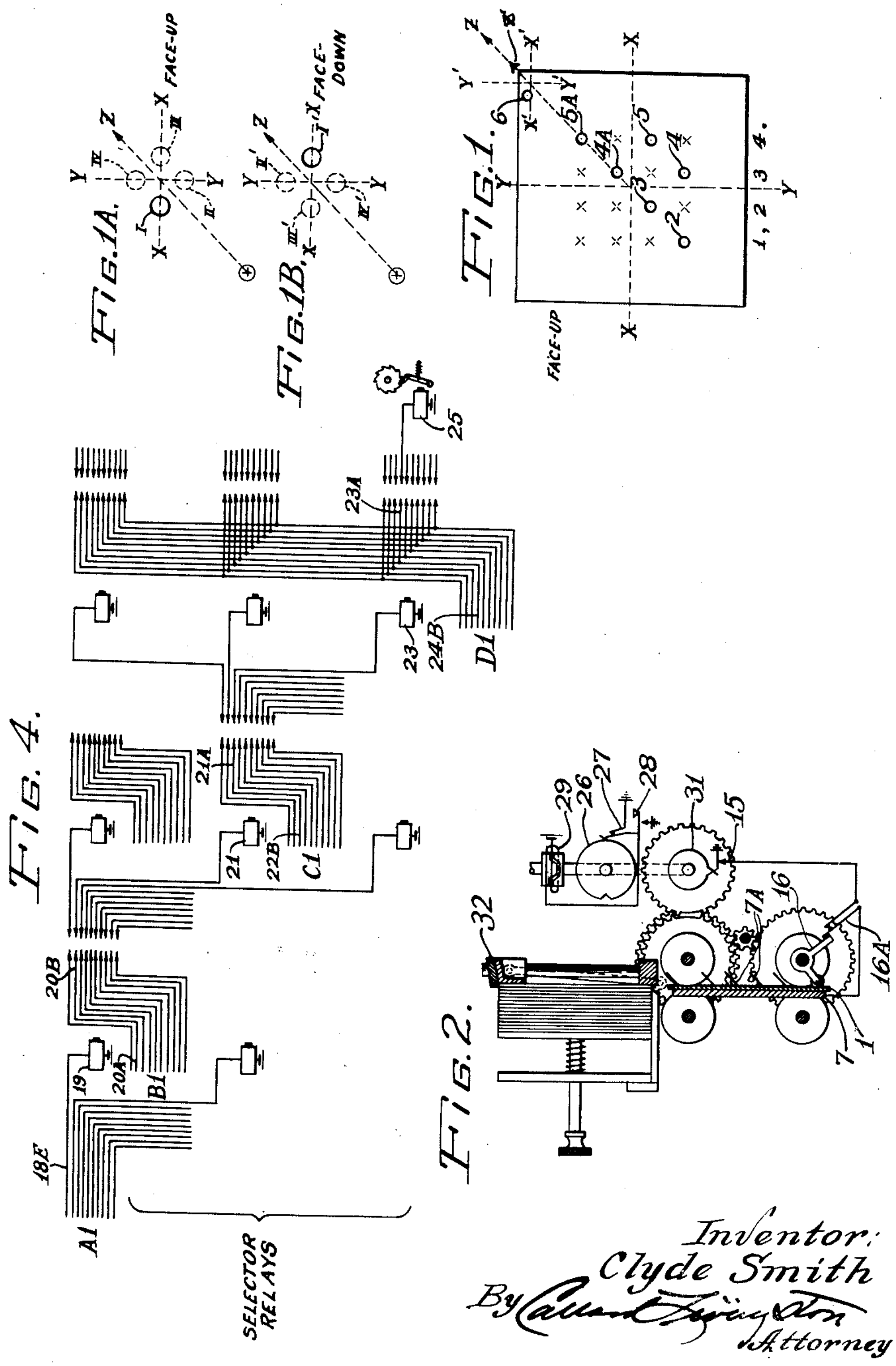
Fig. 1 is a plan view of an omnipositional control card.
Fig. 2 is a vertical sectional view through a card feeding unit with parts shown schematically.
Fig. 4 is a diagram illustrating the incoming circuits for the translating relays of Fig. 3, showing in part also connections for selector relays.

In a simple embodiment of the system, a control card, perforated in four-unit code, may be used, such a card being illustrated in Fig. 1 and being perforated to yield the digits 1–2–3–4, this combination being readable also as "1,234," in which the thousands digit (1) is designated at 2, the hundreds digit (2) at 3, the tens digit (3) at 4 and 4A and the units digit (4) at 5 and 5A, with a pilot perforation designated at 6.

The card-sensing operation utilizes a conventional card-feeding mechanism, such as shown in Fig. 2, which includes a vertically reciprocable card-engaging picker blade 32 and associated driving gears for moving the cards one-at-a-time downwardly into sensing position against a ground plate 7.

Circuit connections are set up in accordance with the perforations in the card through the agency of sensing means, such as the brushes generally designated at 7A in Fig. 2.

Figures 3, 5:
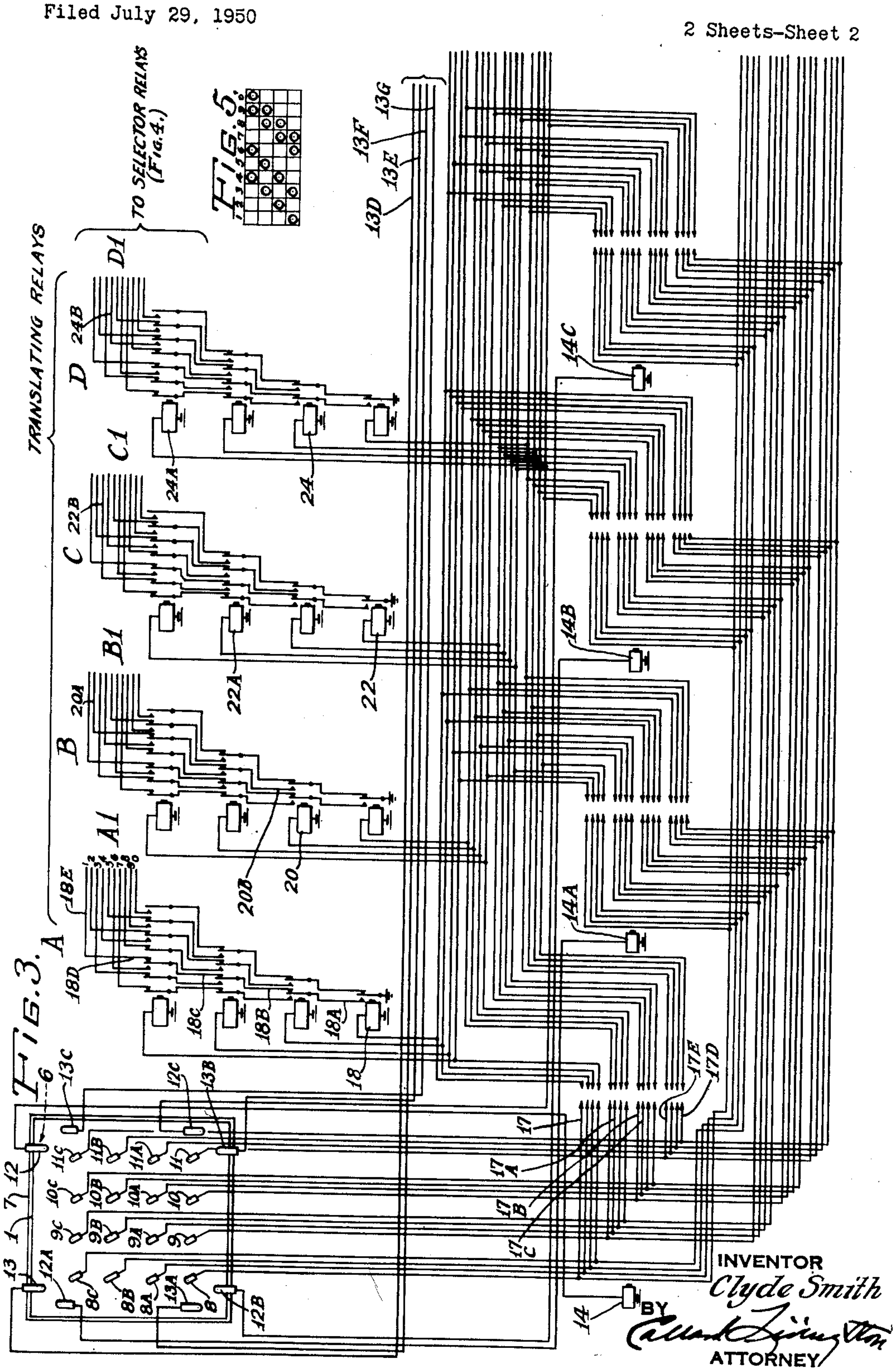
Fig. 3 is a schematic view of the sensing brushes used in conjunction with the card feed of Fig. 2 together with a circuit diagram showing the transfer and translating relay means for evaluating sensed card data as a digital count.
Fig. 5 illustrates the conventional four-unit code used, whose perforations are translatable into terms of digital representation from 1 to 0.

Depending upon which of eight possible positions the card occupies in the feed at the time it is sensed, one of the shift relays 14 (Fig. 3) will be operated in accordance with the relative positioning of the pilot perforation 6 to establish an appropriately oriented translating circuit to one of the translating relays indicated at A, B, C, and D in Fig. 3, "orientation" in the sense used meaning the automatic adjustment of the circuits for sensing the card perforations according to a predetermined evaluating plan, regardless of the position of the card with respect to the sensing means or brushes 7A.

After the appropriate translating-relay group has been selected under control of the pilot means, the requisite individual thousands, hundreds, tens, and units relays will be operated in accordance with the digital card perforations to operate selector means, such as the relays 19 of Fig. 4, which in turn will actuate desired instrumentalities, for example the counter 25.

In the specimen control card, shown in Fig. 1, it will be observed that the pilot indication or perforation or factor 6 is asymmetrically situated with respect to the center of the card as determined by the common intersection of the principal coordinate axes X—Y and the vector Z.

If said card is rotated from the initial position shown in Fig. 1 in 90° steps counterclockwise about its center with vector Z as a radius, it will appear that the pilot perforation 6 will successively occupy the four different positions I, II, III, IV, indicated in the coordinate diagram of Fig. 1–A. It will also be understood that if the card be turned over upon its opposite face and the aforesaid rotation then repeated, the pilot mark 6 can occupy an additional four positions displaced (180° counterclockwise) from the positions of Fig. 1–A, to the corresponding successive positions shown in Fig. 1–B, i. e. I′, II′, III′, IV′.

In the orientation of the card, face-up, according to Figs. 1 and 1–A, the pilot perforation in its initial or primary position I, lies to the left of the vector Z, while in the face-down initial position suggested by Fig. 1–B, this perforation lies on the right side of vector Z, whereas were it situated radially on the vector there would be no change whatever in its relative coordinate positions in any orientation of the card, and it is in this sense that the locating of the pilot indication has been characterized for convenience as "asymmetrical."

Assuming that the control card is rotated about its center, it will appear that in each of the successive positions, assuming a square card, the successive sensing positions of the pilot holes, according to the plan of Figs. 1, 1–A, 1–B, are in quadrature relationship for each side of the card, and in effect rotate about a pilot center in the pilot field, which center is at the intersection of the pilot coordinates X—Y, Figs. 1–A, 1–B, as the card itself is rotated about its own center at the intersection of the main coordinates X—Y in Fig. 1.

Thus, supposing the card of Fig. 1 to be turned onto its next edge, anticlockwise, then the pilot hole 6 or Fig. 1 would arrive in the position of the hole indicated at II, Fig. 1–A, and so on. This same quadrature relation obtains when the card is turned over and rotated about its center.

Circuit and functional objects of the system are best illustrated in a description of its operation, and accordngly it is now assumed that perforated cards, like card 1, ire loaded into the automatic card feed shown in Fig. 2, ind a control key 28 is depressed to energize the usual electromagnetic clutch means 29 to actuate the feed and reciprocate the card picker 32, so as to displace one card downwardly into the sensing position where it remains momentarily so that brushes 7A may complete circuits to the plate 7 through the card perforations, plate 7 being momentarily grounded at this time by closure of the card-operated switch 16A and the feed cam switch 15.

The disposition of the pilot and digital sensing brushes necessary for a four-digit system is illustrated in Fig. 3, which shows the card 1 in position on the ground plate 7, the pilot perforation (primary position) underlying the pilot brush 12, by means of which the shift relay 14 is energized, thereby extending the digital control and count to the translating relays in the manner shortly to be described.

All of the brush contacts prefixed by the reference numeral 8 in Fig. 3 (of which there are four—8, 8A, 8B, 8C) will sense card perforations in the thousands group, while the brushes prefixed 9 (9, 9A, 9B, 9C) 10 (10, 10A, 10B, 10C), and 11 (11, 11A, 11B, 11C) respectively, sense perforations in the hundreds, tens, and units groups in the several possible feeding positions of the cards.

In the present example, pilot brush 12 having energized shift relay 14, shift relay contact 17 connects the thousands brush 8 to energize translating relay 18 in Group A, thereby applying ground to its contact 18A, and thence via normally closed chain contacts 18B, 18C, and 18D to conductor 18E, which results in energization of selector relay 19 (Fig. 4).

Similarly, brush 9A is connected by shift relay contact 17A to energize translating relay 20 in Group B, thereby connecting operating ground at its contacts 20B through the remaining normally closed chain contacts of this group of translating relays, to conductor 20A, which results in the energization of selector relay 21 (Fig. 4), through selecting relay contact 20B.

Up to this point, the sensing operation has been extended for the digital count of one thousand and two hundred, and since the card in this example is perforated to read "one thousand, two hundred and thirty-four" (1,234), there remains the extension of the selecting circuits through the third position in the hundreds group and the fourth position in the units group, in the following manner:

Shift relay contacts 17B and 17C (Fig. 3) connect brushes 10 and 10B (detecting perforations 4 and 4A, Fig. 1), energize translating relays 22 and 22A and apply operating ground to conductor 22B and thence via the now closed selector relay contacts 21A (Fig. 4) to energize the third tens group selector relay 23, which now transfers the circuit for the final connecting step in the units bank.

Shift relay contacts 17D and 17E, being grounded through brushes 11A and 11C (and card perforations 5—5A, Fig. 1) effect energization of translating relays 24 and 24A through the obvious chain contacts in Group D, and apply operating ground via conductor 24B to energize the final units circuit in fourth position at selector relay contact 23A to energize the desired device, in this instance the counter 25, which corresponds to the card perforation 1,234.

The foregoing sensing operation is completed as a result of the opening of the master control switch 15 (Fig. 2) by continued travel of the feed cam 31, which breaks the master circuit or ground for the ground plate 7.

The card feeding cycle is completed by opening of a holding circuit for clutch means 29 at cycling cam switch 27 by cam 26.

In the foregoing illustrative example, the control card was assumed to be in a primary position of orientation in the feed, with pilot brush 12 and shift relay 14 controlling the translating and selecting circuits.

It will be observed in Fig. 3 that there are two pilot brushes in each of the four corner regions of the sensing bed or ground plate.

The pilot brushes 12, 12A, 12B and 12C supervise the orientation of the translating and selecting circuits when the control card is disposed "face-up" and in the successive, anticlockwise-displaced positions corresponding to positions I, II, III, and IV in the diagram of Fig. 1–A; whereas, the pilot brushes 13, 13A, 13B, 13C correspond to the successive "face-down" positions I', II', III', and IV' of Fig. 1–B.

Additional shift relays 14A, 14B, and 14C, respectively controlled by pilot brushes 12A, 12B, and 12C, extend the translating circuits through the remaining relays in Group A, B, C, and D (Fig. 3) in like manner.

Only the circuits for the "face-up" pilot control are illustrated in detail.

For the "face-down" pilot control circuits, four additional shift relays, like relays 14, 14A, 14B, 14C, and connected in like manner to corresponding translating relays as shown for those in Groups A, B, C, and D, are required, one of each of said additional shift relays being connected to a corresponding pilot brush by conductors 13D, 13E, 13F, and 13G (Fig. 3).

While the invention has been illustrated on the basis of a four-digit system, it will be understood that the entire digital range of the decimal system may be used; and in Fig. 5 there is shown the code perforation required to render a digital count from 1 to 0.

Moreover the advantages of the multipositional sensing feature are not restricted to a card of square configuration, although the latter afford considerable advantage in handling, as the square card can be turned on any of its edges very readily for shuffling and stacking purposes.

In its fundamental aspects, the invention will now be understood to include the control card with data thereon to be evaluated dependently upon its position relative to the sensing brushes, along with the pilot data arranged on the card in correspondence with the several possible sensing positions to control the evaluation sensed in any particular position.

Additionally, the system includes electrical selecting devices, such as the relays of Fig. 4; sensing means, such as shown in Figs. 2 and 3, and including both counting and orienting or pilot brushes or other detectors for reading or sensing the card data, together with pilot circuit means including the transfer or shifting means, such as relays 14, and the translating means shown in groups A, B, C, and D of Fig. 3. It will be understood that the system may be expanded as to its digital or evaluating capacity, and that control cards utilizing expanded arrangements of pilot and counting perforations or equivalent marks or control factors detectable by various known types of sensing apparatus may be used without departing from the scope of the invention.

I claim:

1. For use with card-controlled apparatus, a control card having control data disposed symmetrically thereon relative to the center of the card thereon to be sensed and evaluated to produce identical control response in a plurality of positions of the card relative to a sensing means, and pilot data disposed in only one predetermined locale on said card for controlling said sensing means in correspondence with each possible evaluating and sensing position to produce the aforesaid identical data evaluation sensed in said position.

2. A control card for use with card-controlled machines, said card being square and having a pilot perforation asymmetrically situated in a corner region thereof off any radius from the center of the card so as to be successively displaced in relative quadrature positions as the card is turned successively onto its edges, said card being adapted to have one set of control perforations situated in the mid-regions thereof to be evaluated identically in all positions of the card in correlation to corresponding positions occupied by the pilot perforation in a sensing machine adapted to be controlled by said pilot perforation.

3. In electrical card-controlled apparatus which includes selecting circuits translating circuits, and card-feeding and sensing means for feeding and sensing a square card in any one of four positions on one of its four edges, face-up or face-down, improvements comprising, to wit: a square control card having sensible control data arranged in a central field thereon, and a single pilot index indication situated in a predetermined area closely subtending a corner of the card, pilot sensing means arranged in two positions at each corner of a square sensing field part of the sensing means in said apparatus, each of said corner positions lying on one side of a bisector of the appertaining corner angle, and circuit connections between said pilot sensing means and said translating circuits for controlling said selecting circuits to yield an identical selection result for any given sensing data on said card in any of eight possible positions of said card in said sensing field, whereby selective orienting of the card relative to said feeding and sensing means is rendered unnecessary.

4. For use with card-controlled selecting apparatus, a square control card adapted to have sensible control indications located in a central region thereof, said card having a sensible pilot indication situated in a corner region thereof at one side of a line connecting the center of the card with the apex of said corner region; means for positioning said card in a sensing field with the marginal edges thereof in a predetermined position of orientation relative to a fixed center in the field; means in said field for sensing said control indications in the card in any of four positions of orientation of the same, each of said positions corresponding to the condition resulting from turning the card successively onto any one of its four marginal edges about said center, said four positions being attainable in both the face-up and face-down conditions in said field; said sensing means including eight pilot-sensing devices of which a set of two are located uniformly adjacent each of the four corners of said field with each device of each set spaced a like distance on opposite sides of a diagonal from the center of said field through the appertaining corner; and means controlled by said control sensing devices cooperatively with said pilot sensing devices for producing effectively identical selecting operations of said apparatus from a card having a given control indication thereon when said card is disposed in any of the eight possible positions of orientation as aforesaid.

5. Card control apparatus for use with electrically-controlled selecting including a square control card adapted to have control punches located therein at any point in a quadrangular field disposed symmetrically with respect to the center of the card, said card having a pilot punch situated in a corner region thereof at a predetermined position which is offset from a diagonal of the card extended from the center thereof through the apex at said corner region; together with sensing means cooperable with said card and including control-punch sensing means disposed in a quadrangular sensing field corresponding dimensionally to said first-mentioned field in the card, and pilot-punch sensing means situated uniformly at the four corners of said sensing field and at two positions at each said corner with each said position offset identically from a diagonal corresponding to said first-mentioned card diagonal such that in any of eight possible congruent positions of said card in said sensing field, face-up or face-down, the said pilot punch therein will be in register with a said pilot-punch sensing means; said apparatus further including circuit connections controlled by said control and pilot sensing means for establishing effectively identical control circuits for any given arrangement of sensed control punches in said card regardless of which of the eight possible positions said card occupies.

6. Control-card apparatus comprising sensing means for use with square control cards and including punch-detecting devices located in a quadrangular array in a quadrangular field which is symmetrical with respect to a center therein and which corresponds to the center of a square card adapted to be positioned congruently in said field; said sensing means further including a pair of pilot detecting members at each corner of said field, the pilot detecting members of each said pair being uniformly located at each corner equidistantly from the appertaining corner and from the edges forming said corner and also from a diagonal from the center of the card to said appertaining corner; and control card means including a square control card dimensioned to lie congruently in said sensing field and having one or more control punches located in a central quadrangular field therein which corresponds to said array and is symmetrical relative to the center of the card and said center of the sensing field, said card further having a single pilot punch situated in a corner region thereof at a position to register with one of said pilot detecting members; together with selector means controlled by said detecting devices and acting to establish effectively identical selecting operations responsive to detection of any given control punch and a pilot punch in a said card in any of eight possible congruent positions of the card in said field, including four positions of the card face-up, and four positions thereof face-down.

7. In combination, a control card and sensing apparatus therefor including means to sense control factors situated in any of a plurality of predetermined positions uniformly distributed in a symmetrical pattern about a first center constituting a main sensing field, and further having a plurality of pilot fields situated in a number of positions about the main field depending in number upon how many sensing positions the card is intended to occupy for one face thereof when turned about said first center; said pilot sensing fields each having two pilot-factor detectors, one for face-up, and one for face-down card-sensing, and said detectors in each pilot field lying on opposite sides of a radius of the first main field center, and on different radii of their own centers; said card including a main control field disposed centrally of the margins thereof and having one or more control factors situated therein in positions each registering with one of the positions of the main sensing field, and said card further having a single pilot factor located in a pilot field situated in the card to correspond positionally with any of the pilot fields of the sensing means when the card is turned into the corresponding sensing position; said pilot factor in the card being situated eccentrically of a pilot center which registers with said center of the detectors so as to change positions orbitally about the card pilot center when the card is turned as aforesaid, for cooperation with any one of the pilot detectors in the sensing means which corresponds to the position occupied at the time by the card, said pilot detectors controlling the main field sensing means in accordance with the position of the cards.

8. For token-controlled devices, a combination comprising a control ticket having a predetermined main center about which sensible control factors are positioned in a main field at points lying at the intersections of rectangular coordinates in square array about said center; said ticket being adapted to occupy any of a plurality of face-up or face-down positions in the sensing operation, each position being a rotative displacement about said main center; said ticket further having a single pilot field situated outside of said main field and along a radius from said main center; said pilot field having a pilot factor located in any one of a plurality of pilot positions disposed radially about a pilot center lying on said radius such that as said ticket is rotated positionally about said main center, said pilot factor is displaced in a rotative sense positionally about the pilot center to occupy control positions each corresponding to a sensing position of said ticket; together with sensing means including a main sensing field with sensing devices each located to register with one of the control factor positions in the main ticket field, as well as a plurality of pilot fields located about said main field center, one for each intended position of the ticket; each pilot field in the sensing means having a pilot center to register with the pilot centers of the ticket; and pilot-factor detecting means situated in each pilot field to register with and detect the pilot factor in the ticket when the latter is positioned to dispose the ticket pilot factor in any sensing pilot field, whether the ticket is face-up or face-down.

9. Electrical card control apparatus including means for feeding control cards having a single pilot indication and control indications thereon into a sensing position oriented with either face exposed for sensing and turned into any of a plurality of angularly displaced positions about a center in the plane of the card at said position; sensing means for detecting control indications on said cards at said position; translating circuits for reading the sensed card indications in any of said positions of orientation; and pilot circuit means for sensing the single pilot indication on said card in any of said positions of orientation thereof and connected to operatively select a certain translating circuit corresponding to a given orientation of the card; and selector circuits selectively controlled by said translating circuits.

10. Card controlled apparatus comprising, in combination with electrically controlled selecting devices, transfer and translating circuit means connected and operable for selectively completing operating circuits to said devices in accordance with a single pilot perforation and certain corresponding data perforations on a control card sensed at either of its faces and in any of a number of positions rotated in a sensing plane about a center in said faces and plane; means for sensing pilot and data perforations on the card as aforesaid and actuating said transfer and translating means according to the perforations sensed to select an operating circuit to a certain one of said devices corresponding to the particular control data carried on the card in any of a plurality of positions of the card in the sensing plane as aforesaid.

11. Card controlled apparatus including a flat control card having one or more sensible control indications and a single pilot indication thereon; means for sensing the face of said card for both control and pilot indications; selector means actuated in accordance with the control indication sensed by said sensing means; and orienting circuit means operably controlled by the pilot indication sensed as aforesaid for making connections with the particular selector means called for by the particular control indications sensed as aforesaid, regardless of which face of the card is presented to said sensing means or into which one of at least eight possible rotative positions of orientation the sensed card has been turned about its own center at the time it is sensed, whereby the particular desired selector means will be actuated by the corresponding control indication under control of a single pilot indication regardless of which of said positions of facial or rotative orientation the card may occupy during sensing.

12. Card-controlled apparatus including a control card having one or more control perforations therein but only a single pilot perforation located asymmetrically with respect to said control perforation and a reference center in the card, by reason of which the card, when sensed by complementary sensing apparatus, will produce identical control readings in any one of at least eight positions of facial and rotative orientation of the card at the time it is sensed including sensing of either face of the card in any of a plurality of positions of the card turned in its plane about said reference center; and sensing apparatus including means for sensing said card for control perforations at a face thereof, together with apparatus for sensing pilot perforations at said face and including pilot-perforation detecting means likewise located asymmetrically about a complementary reference center which said face of the card confronts in sensing position relative to said sensing apparatus; and means controlled by said pilot-perforation detecting means for controlling the control-perforation sensing means to produce the identical readings of the control perforation in the various positions of orientation of the card, as aforesaid.

13. Card-controlled apparatus comprising control cards having control perforations disposed at any of a plurality of predetermined value positions within a main field, and a pilot perforation disposed at any of several predetermined positions about a center in a card pilot field at one side of said main field; and sensing means including perforation detectors arranged at a sensing station in corresponding predetermined value positions matching those of the main field and the pilot field, the detectors for the pilot field being located in plurality of orientation positions about the detectors for the main field such that the pilot perforation in any of its positions in the pilot field on the card will have a corresponding pilot detector located to sense the same in any of a plurality of positions of orientation of the card at said station, the situation of said pilot field on the card with respect to the main field thereon, as well as the situation of said pilot perforation with respect to the pilot field center being such that the position of the pilot perforation relative to said pilot detectors is different for each of said positions of orientation of the card at said station; translating circuit means controlled by said detectors in the main field; transfer circuit means controlled by said pilot detectors to operatively connect a particular translating circuit to correspond with a particular position of orientation of the card sensed at said station; and selector means actuated by said translating means.

14. Card-control apparatus including means for feeding square control cards into and out of sensing position without regard to the orientation of the card with respect to its edges or faces at said sensing position; and control card means comprising a square card having sensible control data in a centralized control field on the card, said data being positioned in said centralized field at one or more points each defined by virtual intersecting rectangular coordinates each respectively parallel to an edge of the card, said card having a pilot field close to one of its corners, and sensible pilot control means situated in said pilot field at a position about a pilot center defined by two virtual rectangular coordinates, each parallel to an edge of the card, said pilot center lying on a diagonal connecting the coordinate center of the centralized field, said pilot control means being located in any one of at least four orienting positions with respect to either card face situated symmetrically at one side of said diagonal about said pilot center; together with sensing means at said sensing position including sensing instrumentalities situated in a complementary centralized field as well as in four complementary pilot fields about said complementary centralized field; and means controlled by said pilot sensing means for controlling the centralized sensing means in any of said oriented positions of the card relative thereto for producing identical control effects from given control data in any of said oriented positions.

15. Card-controlled apparatues including a card sensing device in which control cards may be positioned in any of a plurality of possible conditions of orientation; selecting means actuated selectively in accordance with card-control data sensed by said device, the selective controlling effect of said data being positional and subject to modification by changes in orientation of the cards relative to said sensing device; and means including a single pilot index asymmetrically located relative to the control data on said cards; means cooperable with said sensing device for sensing said pilot index in any of the oriented positions of said card; and translating apparatus controlled by said pilot-sensing means for producing the same particular control effect from given card data regardless of the orientation of the cards relative to said sensing device.

16. A control card for use with card-controlled apparatus, said card being square and having a single pilot perforation situated in a pilot field adjoining a corner of the card, said pilot perforation lying always at one side of a diagonal through the center of the card to the corner of the card appertaining to said pilot field, and said pilot indication further being disposed at one side of either one of a pair of rectangular coordinates each respectively parallel to two edges of said card and each intersecting said diagonal at the zero intercept of the said coordinates, whereby said pilot perforation can occupy any of eight different relative positions as the card is turned onto each of its edges, face up or face down; said card further having a single area for control indications with the center of the card also defining the center of said control area, each control perforation of given value having only one predetermined position in said control area.

17. A flat control card for use with card-sensing apparatus, said card having at least four equilateral edges, a single control field disposed uniformly about the center of the card and at least one sensible control factor located at a certain value-determining position in said control field; each control factor having only one predetermined position in said control field for the value to be represented thereby; said card further having a single pilot factor situated in an area outside of the control field and adjoining a corner angle determined by any pair of meeting card edges, said control factor also lying at one side of a radius connecting the center of the card and control field to the apex of said corner angle; and said pilot indication further lying at one side of any one of a set of equiangular coordinates all intercepting said radius and each parallel to at least one edge of the card, whereby the pilot perforation will occupy different relative positions about the card center as the card is turned onto its edges, face up or face down.

References Cited in the file of this patent

UNITED STATES PATENTS

| | | |
|---|---|---|
| 1,928,209 | Mills | Sept. 26, 1933 |
| 2,105,291 | Maul | Jan. 11, 1938 |
| 2,288,770 | Armbruster | July 7, 1942 |
| 2,399,755 | Mills et al. | May 7, 1946 |